3,391,176
CHELATE COMPOUNDS AND PROCESS FOR
THEIR PREPARATION
Frederick Grossmith, Rustington, England, assignor to Beecham Research Laboratories Limited, Brentford, Middlesex, England
No Drawing. Continuation-in-part of application Ser. No. 274,936, Apr. 23, 1963, which is a continuation-in-part of application Ser. No. 47,371, Aug. 4, 1960. This application Feb. 16, 1967, Ser. No. 616,476
Claims priority, application Great Britain, Feb. 16, 1966, 6,735/66
5 Claims. (Cl. 260—448)

ABSTRACT OF THE DISCLOSURE

Chelate compounds of aluminum, magnesium, iron or calcium containing a salicylate bidentate ion or a 5-hydroxy salicylate ion with or without bidentate ions formed from certain mono-carboxylic alpha-hydroxy acids or tetradentate ions formed from tartaric acid or citric acid and also containing magnesium, calcium, sodium, potassium or ammonium radicals. The compounds are intended for use in analgesic and antipyretic preparations.

CROSS REFERENCE TO RELATED APPLICATIONS

This is a continuation-in-part of my copending application Ser. No. 274,936 filed Apr. 23, 1963, now abandoned, which is a continuation-in-part of my application Ser. No. 47,371 filed Aug. 4, 1960 (now abandoned).

BACKGROUND OF THE INVENTION

This invention relates to pharmaceutical compositions and is particularly concerned with chelate complexes of salicylic acid and/or acetylsalicylic acid (aspirin) or gentisic acid, either alone or in association with gluconic acid or other alpha-hydroxy acids and with various metals.

The novel compounds are intended for use in analgesic and antipyretic preparations, which are employed to relieve headaches, muscular and neuritic pains and in the treatment of rheumatism.

It is a disadvantage of the oral administration of aspirin that it has an irritant effect on the gastric mucosa, although its action is much less severe than that of salicylic acid—except in susceptible persons. Acetylsalicylic acid has come under increasingly severe criticism since evidence was found of gastric lesions and localized hyperaemia due to contact of particles of aspirin with the gastric mucosal wall. The haemorrhagic propensities of aspirin impose a particularly serious limitation on its use as an antirheumatic and uricosuric agent as, in the treatment of rheumatism and related conditions, the dosage needs to be high and prolonged.

It is an object of the present invention to provide compounds which possess the analgesic and other therapeutic properties of aspirin while having a bland effect on the oral and gastric mucosa.

It is known that sodium gluconatoaluminates and chelated hydroxoaluminates of other alpha-hydroxy acids may be used as soluble buffer antacids in the treatment of gastric hyperacidity.

It has now been found that in these compounds gluconic acid may be replaced wholly or in part (according to the compound) by aspirin, salicylic acid or gentisic acid. Compounds may be prepared in which varied molar ratios of salicylic, acetylsalicylic or gentisic acid to gluconic acid are employed. Examination of the compounds prepared from aspirin indicates that they are salicylato complexes in which the aspirin has been deacetylated, the displaced acetyl radical being co-ordinated to the aluminium (or other central metal ion), replacing a hydroxo group.

In suitable compounds the chelating acid may be wholly salicylic acid or acetylsalicylic acid, but these compounds are only stable either (a) under highly alkaline conditions, existing in the presence of excess hydroxyl ion or (b) when part of the chelating ligand is present in the simple form in which the hydroxyl group has not lost its proton, e.g. when it is present as excess sodium salicylate.

The aluminium salicylato chelates apparently exist only in the presence of excess hydroxyl ion or chelating acid ionic species and we found that as little as 5% gluconic acid (in the form of gluconatoaluminate) or other suitable alphahydroxy acid (as chelates aluminate) stabilizes the salicylato aluminate and enables it to be produced in solid form.

The stability of the mixed salicylato-gluconatoaluminates without employing excess alkali hydroxide and at approximately neutral pH (of Example 3), together with the high solubility of many of these preparations, is in marked contrast to the properties of the salicylato compounds alone and this is an important feature of the invention.

In addition to being analgesic compounds, the substances are also antacids and generally it is desirable to incorporate higher proportions of gluconic acid (or other non-salicylate hydroxy acid) than is present in the 19 to 1 ratio compound, in order both to increase the solubility of the compound and to ensure that a quantity of the preparation containing 5 to 10 grains of aspirin should exert a significant buffering action on acid gastric juice.

Provided the ratio of salicylic acid to gluconic acid is not too high, the compounds are very highly soluble and may have a nearly neutral pH reaction. One of the 4 to 1 aspirin to gluconic acid compounds, for example, has a solubility of the order of 50% w./w. (c. 65% w./v.) and the pH of a 30% w./v. solution is 6.6. A preparation of the 1 to 1 aspirin to gluconic acid compound may be manufactured to provide, for example, 5 or 7.5 grains of aspirin to the teaspoonful (4 ml.) dose.

When one or two teaspoonfuls (from 5 to 15 grains of aspirin) are added to a simulated gastric pool of 100 ml. N/10 hydrochloric acid, the pH is raised to between 3 and 4.5. Salicylic acid can be obtained from the clear solution by benzene extraction; by contrast, when equivalent amounts of sodium salicylate are added to a similar pool of acid, copious and coarse precipitates of salicylic acid are obtained. With compounds according to the present invention, with salicylic acid in solution at a pH of 3 to 4, local action should be bland and absorption should be rapid.

These expectations have been substantiated by animal tests, which indicate that the compounds have analgesic potency equivalent to their aspirin contents and that they do not cause any gastrointestinal haemorrhage. Some of the compounds of the invention and their preparations are very stable and this is in contrast to various known effervescent preparations intended to form sodium aspirin by reaction during dissolution. These preparations are susceptible to hydrolysis of the aspirin component during storage, often leading to complete loss of reactivity of the effervescent vehicle, and to loss of palatability, resulting from the presence of the irritant free salicylic acid and acetic acid.

In addition to the sodium salicylatohydroxoaluminates it has been found that salicylatohydroxo metal chelates may be prepared, in which calcium and magnesium are substituted for aluminium.

SUMMARY OF THE INVENTION

The present invention provides compounds of the general formula:

$$M_x[M'_y(AO)_z(CH_3CO.O)_w(OH)_{1x-w+y(m-2z)}(H_2O)_v]_n$$

and dimers thereof, wherein M is magnesium, calcium, sodium, potassium or the ammonium radical, M' is aluminium, magnesium, iron or calcium, and AO is the salicylato bidentate ion:

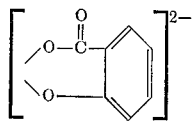

or the 5-hydroxysalicyato ion, either alone or together with an ion or ions selected from the group consisting of the bidentate ions formed from the monocarboxylic alpha-hydroxy acids of the formula:

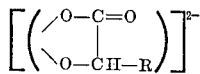

in which R is $CH_3$ or $C_4H_9O_4$, and the tetradentate ions formed from tartaric and citric acids of the respective formulae:

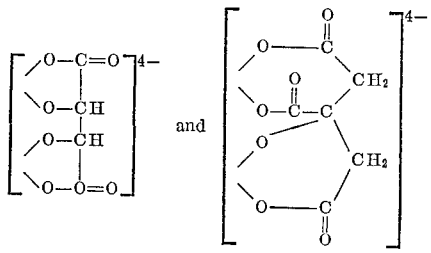

wherein $x$ is an integer from 1 to 5 inclusive, $y$ is unity for bidentate ions and 2 for tetradentate ions, $w$ is an integer from 0 to 4 inclusive, $z$ is an integer from 1 to 4 inclusive, $n$ is 2 for bidentate ions when the valency of M is greater than 1 and is unity in all other cases, $l$ is the valency of M divided by $n$, $m$ is the valency of M' and $v$ is an integer from 0 to 6 inclusive.

When AO is a mixture of ions, it is to be understood that either a mixture of chelating acid ions in the complex anions or a mixture of complex anions is referred to. The phenomenon of polymerisation by olation is well known and the type of reaction involved may be represented as follows:

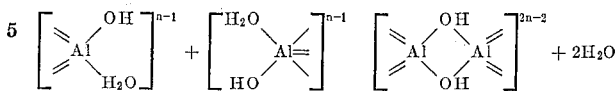

It will be seen that the reaction involves the elimination of aquo groups co-ordinated to the aluminium ions in the monomer (or aluminium ions at the end of the chain in the continued process of olation). The displaced water molecules may remain in "outer spheres" of the aluminium ions however. Thus, in Example 3 following, the cryoscopic estimation of average ionic weight indicates a dimer, but the ash result is in slightly closer agreement with a molecular weight indicative of water retention at the level of the monomer.

Furthermore, water equivalent to that expected to be removed from coordination sites in forming the dimer is lost from the compound at a temperature of 60° C., while the remaining water is not lost until a significantly higher temperature is reached. This trend has also been noted with the higher polymers of chelated gluconatoaluminates. With the mixed salicylato and gluconato compounds the cryoscopic estimations show that many of the 1 to 1 salicylic acid to gluconic acid compounds are dimers, while the 4 to 1 ratio and higher ratio compounds examined are monomers.

In the major salicylato complexes of practical interest, the ratio of chelating acid to metal is 1 to 1, or not much higher, and with this ratio the co-ordination number of aluminium is six.

As with the wholly gluconatoaluminates, it is found that solution of mixed salicylatogluconato compounds are almost completely non-astringent to the oral mucosa, indicating the virtual absence of free aluminium ions. Other evidence of complex formation includes:

(1) Many of the compounds are of high solubility which is in striking contrast to the insolubility of aluminium salicylate and aluminium aspirin, and the relatively low solubilities of aspirin and salicylic acid.

(2) No precipitates are produced at pH 10, when ammonium chloride and ammonium hydroxide are added to solutions of the compounds, at least in the concentration range 0.02 to 0.1 M. Similarly, clear solutions result, in most cases, when sodium fluoride is added to solutions of the compounds in the same concentration range.

(3) Cryoscopic estimations of molecular weights indicate clearly that the solutions do not comprise mixtures of simple ions which would have low average ionic weights. These determinations, and the other assay data are in good agreement with the formulae assigned to the compounds.

Cryoscopic estimations of average ionic weights and assay data in comparison with expected values for several of the examples are shown in Table I.

STRUCTURE

In the light of the cryoscopic and assay data the structures of the compounds described in the application are considered to be of the following types:

(i) All salicylato monomer (a component of the products of Examples 1, 2 and 4).

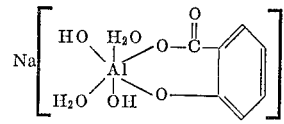

Sodium salicylatodihydroxyaluminate III (ii) Structure of a mixed salicylato gluconato dimer (Example 3).

TABLE I.—CRYOSCOPIC AND ASSAY DATA

[For examples 1 to 5(a)]

| Example | State of Polymerisation (cryoscopic) | Observed or Expected | Average Ionic Weight | Loss on Drying 60° in vacuo | Ash [2] | ASSAY,[1] percent | | | | |
|---|---|---|---|---|---|---|---|---|---|---|
| | | | | | | Na | Al | Salicylic acid | Acetic acid | Mg |
| 1 | Monomer plus Dimer | Observed | 145.0 | 1.74 | 37.3 | 11.3 | 8.72 | 19.0 | 11.3 | |
| | | Expected | 141.0 | 2.84 | 30.5 | 10.9 | 8.51 | 21.8 | 9.3 | |
| 2 | Monomer | Observed | 134.1 | 3.1 | 30.6 | 8.9 | 7.1 | 28.2 | | |
| | | Expected | 139.0 | 2.9 | 28.8 | 9.0 | 8.8 | 36.1 | | |
| 3 | Dimer | Observed | 181.8 | 6.14 | 28.0 | 9.2 | 8.1 | 19.6 | | |
| | | Expected | 179.0 | 5.8 | 28.8 | 9.2 | 8.7 | 22.2 | | |
| 4 | Monomer | Observed | 104.8 | 1.5 | 41.9 | 14.2 | 11.0 | 48.0 | | |
| | | Expected | 108.0 | 1.7 | 36.1 | 12.8 | 10.0 | 48.6 | | |
| 5(a) | Monomers plus NaOH | Observed | 78.6 | | 43.4 | 14.5 | | 13.8 | | 5.2 |
| | | Expected | 82.1 | | 37.8+ | 16.8 | | 16.8 | | 5.9 |

[1] No assay data for gluconic acid are shown. A method is available but salicylic acid seems to interfere.
[2] $Na_2O+Al_2O_3$ or $MgO+$ excess alkali as $Na_2CO_3$.

Sodium: This was precipitated and estimated as sodium magnesium uranyl acetate.
Aluminium: The compounds were wet ashed and aluminum was determined by the method of the British Pharmacopoeia for aluminium hydroxide gel.

Magnesium: Estimated by complexometric (volumetric) assay after ashing the compounds and dissolution in acid.
Salicylic Acid: Extracted from acid solution with chloroform which was then evaporated off in the presence of a little ferric alum ammonium monochloracetate buffer. More buffer was added and the optical density measured at 530 m$\mu$.
Acetic Acid: Distilled from a sulphuric acid solution into standard alkali and back titrated. Distillate checked for salicylic acid.

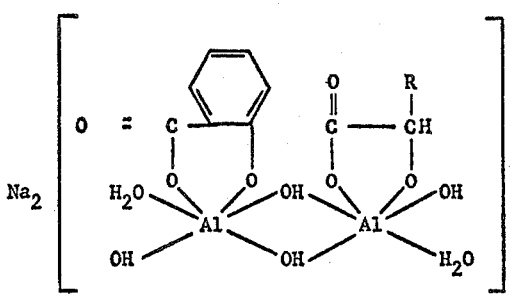

Disodium salicylatogluconatodihydroxodiaque-$\mu$-diol-dialuminate III

R=$C_4H_9O_7$, to complete $C_6H_{10}O_7$, the gluconato ligand.

The compound octasodium tetrakis(gluconato)bis(salicylato)$\mu$ diacetatodialuminate III dihydrate of the formula:

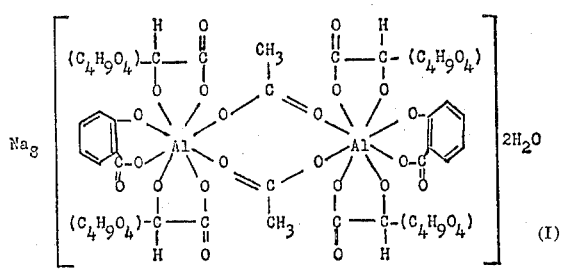

has been found to have specially valuable pharmacological properties.

Preferably, Compound I is prepared by reacting sodium aluminate with gluconic acid, and then reacting the product with acetylsalicylic acid.

Compound I has the following characteristics:

Molecular weight=1440.788
Average ionic weight (9 ions)=160.09
Average ionic weight estimated by cryoscopic means= 155.4

Ash ($Al_2O_3+Na_2O$) calculated=24.91% (dry basis)
Ash ($Al_2O_3+Na_2O$) observed=26.40% (dry basis)

The empirical formula (dry monomer) is:

$Na_4AlC_{21}H_{27}O_{19}$, which is equivalent to
$Na_4[Al(C_6H_{10}O_7)_2(C_7H_4O_3)(C_2H_3O_2)]$
Molecular weight=702.379
Aluminium content=3.84% Al (dry basis)
Sodium content=13.09% Na (dry basis)

Compound I was tested for analgesic potency by the phenylbenzoquinone antinociceptive test (mouse peritoneal writhing test as modified by Brown and Hughes, J. Pharm. Pharmacol., 1962, 14, 399–405). With Compound I analgesia is of a high order and is both rapid and prolonged. The results are superior to those with sodium salicylate and are comparable with those for aspirin.

Tests for antipyretic activity were carried out in rabbits, which were observed over periods of 90 minutes by means of rectal thermocouples and, provided that the individual temperatures did not deviate by more than 0.2° C., the rabbits were dosed intragastrically with 1 mM./kg. of test compound and intravenously with 0.5 $\mu$g. Shigella endotoxin. The temperatures were recorded for a further 5½ hours. Each of twelve rabbits received Compound I, sodium salicylate and control solution on a cross-over basis over a period of 9 weeks. Antipyretic activity was calculated as the differences between control and test areas under the temperature/time plots.

This showed 50% antipyrexia for Compound I and 32% for sodium salicylate. Results for aspirin in previous tests were 52% and 43%.

Biochemical studies were carried out with Compound I, with sodium salicylate and acetylsalicylic acid as comparison compounds as follows:

(1) Salicylate levels in blood plasma and urine were determined at various times between ½ and 24 hours in Corgi dogs, after oral dosage with Compound I.

Plasma salicylate levels in humans were determined between 15 minutes and 3½ hours after oral administration of Compound I.

Urinary excretion was studied up to 54 hours after dosage. Salicylate levels in both urine and blood were compared with those obtained after dosage with sodium salicylate and acetylsalicylic acid.

(a) Dogs.—Pembrokeshire Corgis were dosed orally on the basis of approximately equal salicylate content with encapsulated Compound I (400 mg./kg.), sodium salicylate (80 mg./kg.) and acetylsalicylic acid (90 mg./kg) in a cross-over test.

Blood samples were drawn from a forelimb vein, heparinised and centrifuged. The plasma was removed and stored at approximately −20° C. overnight. Dogs were kept individually in metabolism cages and the urine collected over a period of 24 hours in flasks cooled with "cardice" solid $CO_2$.

Plasma salicylate levels in dogs showed all three compounds to have similar absorption patterns with a flattened peak plasma level of between 155 and 185 $\mu$g. salicylate per ml. plasma, two to four hours after dosage.

The first series of experiments using eight dogs provided blood levels up to eight hours after dosing. A second series using four animals showed that plasma levels after all three compounds declined only slowly. Thus at 12 hours, levels of 106 to 132 $\mu$g. salicylate per ml. plasma were recorded and after 24 hours 36 to 47 $\mu$g.

In general there was no consistent trend in the differences between free and total salicylate levels. Small differences of possible significance were seen in the plasma levels shortly after dosing with Compound I and with acetylsalicylic acid. Thus the plasma levels at half an hour indicated the presence of some conjugated salicylate, both after acetylsalicylic acid and Compound I (10% of the total salicylate level in each case). Again at one hour the circulating level of conjugates was similar both after acetylsalicylic acid (11% of the total salicylate level) and Compound I (15% of the total level).

Comparable values for total urinary salicylate after dosing with Compound I or sodium salicylate were obtained from each collection period. After acetylsalicylic acid however elimination was delayed, the total salicylate appearing between 6 and 24 hours being more than twice the 0 to 6 level.

(b) Humans.—The subjects took on different occasions Compound I, sodium salicylate and acetylsalicylic acid in 50 ml. aqueous solution containing the equivalent of 500 mg. salicylate.

Blood samples were drawn from the ante-cubital vein at times between 15 minutes and 3½ hours after dosing. The samples were collected in heparinised tubes, centrifuged and the separated plasma stored at −20° C. overnight.

The total urine output was collected separately in the two periods 0 to 6 hours and 6 to 24 hours following dosage.

Absorption of all three compounds in humans from solution was rapid. Peak plasma levels following Compound I or sodium salicylate were achieved 15 minutes after administration, while after acetylsalicylic acid the peak occurred at one hour. Compound I appeared to be absorbed appreciably faster than acetylsalicylic acid, but only marginally faster than sodium salicylate. One hour after dosage the salicylate levels produced by all three compounds were very similar. Differences between "free" and "total" salicylate levels were seen 15 minutes after both Compound I (7% of the total level) and acetylsalicylic acid (24% of total), but not following sodium salicylate. At one hour there was a significant difference only after acetylsalicylic acid (14% of total salicylate).

Thus Compound I was absorbed rapidly, some conjugated salicylate being present in the plasma at 15 minutes but none at one hour.

The excretion patterns of all three compounds were similar, although some quantitative differences were observed. With each compound over 98% of the salicylate excreted appeared within 24 hours. After complete hydrolysis of metabolites, however, only some 50% of the administered dose was recovered within 54 hours.

The excretion pattern of Compound I more closely resembled that of acetylsalicyclic acid than of sodium salicylate. After Compound I, however, the total amount of conjugates excreted was slightly greater in the 0–6 hour period compared to acetylsalicyclic acid and slightly less in the 6–24 hour period. The quantitative metabolism of sodium salicylate differed slightly from that of the other two compounds. The amount of alkali labile conjugates excreted after sodium salicylate dosage was lower and the amount of acid-labile conjugates proportionally higher than after either Compound I or acetylsalicyclic acid.

(2) Using radioactive chromium–51 tagged red blood cells, the volumes of occult blood excreted after oral dosing of dogs with Compound I at three dose levels was determined. These blood losses were compared with those produced after dosing with acetylsalicylic acid and sodium salicylate and with undosed control animals.

The principle of the method consists in labelling the circulating red blood cells with radioactive chromium–51 and subsequently measuring and comparing the radioactivity of the faeces and samples of venous blood which are withdrawn during the course of the experiment.

The method used for labelling the red blood cells was based on that of Bannerman (1957, Brit. Med. J. 2, 1032), who applied the method to measure the faecal blood loss in humans.

Pedigree Beagles were used for these studies. A summary of the results obtained is as follows:

Dosage with Compound I at the near toxic level of 1500 mg./kg. daily for 28 days (equivalent to 391 mg./kg. of acetylsalicylic acid, i.e. 75 grains of acetylsalicylic acid every 6 hours to a 50 kg. man) produced a significant increase in gastro-intestinal blood loss similar to that produced by 150 mg./kg. daily of acetylsalicylic acid. At doses of 1000 mg./kg. and 400 mg./kg., however, Compound I did not produce any significant faecal blood loss.

Using the radioactive chromium–51 tagged red blood cell technique, tests were made in human volunteers.

Initially, six subjects were given Compound I in a dose equivalent to 10 gr. of acetylsalicylic acid three times daily before meals for a total of 5 days. The blood loss in the stools was measured for a period before the 5 days of treatment and measurements were continued until shortly after the end of treatment.

Twelve subjects were then given larger doses of Compound I equivalent to 20 gr. of acetylsalicylic acid three times daily. A 5 day course was followed after a drug free interval of two days by a 5 day course of acetylsalicyclic acid, 20 gr. three times daily being given. In two cases the order of taking the drugs was deliberately reversed. The administration of high doses of drugs on an empty stomach was intended to provide a severe test of each drug's liability to cause intestinal bleeding.

Intestinal bleeding was negligible or absent in all subjects who received Compound I with a single exception, this subject having received acetylsalicyclic acid for 5 days prior to taking Compound I. He bled heavily during this time and continued to bleed to a diminishing extent when he took Compound I during the following week.

Bleeding was attributed, in this case, to the after effects of acetylsalicylic acid. A similar, but less marked bleeding always followed large dose acetylsalicylic acid administration. Compound I had clear and obvious advantages over acetylsalicylic acid in this respect.

It had been noted in previous studies that blood loss occurred in every subject, either during or immediately after acetylsalicyclic acid administration.

The invention also provides a pharmaceutical composition comprising Compound I, together with a pharmaceutically acceptable carrier.

The compositions are preferably intended for oral administration in tablets, syrups, granular preparations and similar forms, in which the usual additives, excipients, colouring, flavouring and other materials are included.

The high solubility and freedom from astringency enables palatable syrup preparations and effervescent mixtures to be made as described in some of the examples.

Description of the prepared embodiments:

Example 1

The preparation of a mixed acetato salicylato/gluconato aluminate in which the ratio of aluminium to acids is as 1:0.5; 0.5.

MATERIALS USED

| | G. |
|---|---|
| Dry sodium aluminate 93.8% ($Na_2O:Al_2O_3=1.24$) | 79.27 |
| Aspirin | 72.06 |
| Glucono-delta-lactone | 71.2 |
| Sodium hydroxide | 8.32 |

PROCEDURE (1) The dry sodium aluminate was added to 140 ml. of cold distilled water with stirring, which was continued for 30 minutes.

(2) The glucono-delta-lactone was dissolved in 80 ml. water with heating on a water bath as necessary.

(3) The sodium aluminate solution was poured into the gluconic acid solution and a small quantity of a filter aid was added. The suspension was then filtered under suction. (N.B. The dry sodium aluminate contained iron≡0.07% $Fe_2O_3$.)

(4) The solution was transferred to a beaker on a water bath and the aspirin was added with stirring when the temperature was in the range 60°–70° C.

(5) The sodium hydroxide was dissolved in a little water and added to the bulk when the aspirin had all dissolved.

(6) The solution was then evaporated to dryness in vacuo at 60° C.

AVERAGE FORMULA IN MONOMERIC FORM $$Na_{1.5}[Al^{III}(C_7H_4O_3)_{0.5}(C_6H_{10}O_7)_{0.5}$$
$$(CH_3COO)_{0.5}(OH)_2(H_2O)_{1.5}]$$
$$317.19$$

STRUCTURE (1) Approximate estimate of degree of polymerisation. The cryoscopic estimate of average ionic weight=145. If $x$=the number of aluminium ions in the complex anion $$\frac{317x}{1.5x+1}=145$$

$$x=1.46$$

This suggests a salicylato monomer and a gluconato dimer.

(2) The dimer will be $$Na_4[Al_2^{III}(OH)_6(C_6H_{10}O_7)_2]2H_2O$$

(The monomer would have had, originally $1H_2O$ per molecule); this leaves for the salicylato compound:

$$2Na[Al^{III}(OH)(C_7H_4O_3)(CH_3COO)(H_2O)_2]$$

This indicates 9 ions and an average ionic weight=

$$\frac{1268.76}{9}=140.97$$

Observed=145

(3) If $2H_2O$ are lost from the gluconato dimer at 60° C. in vacuo this represents:

$$\frac{36.032 \times 100}{1268.76}=2.84\%$$

Observed=1.74%

The compound therefore comprises a mixture of 1 mole tetrasodiumbisgluconatohexahydroxodialuminate III+2 moles of sodium salicylatoacetatohydroxoaluminate III.

PROPERTIES

Appearance—biscuit coloured granular solid (N.B. colour probably due to traces of iron)
Solubility at 23° C.—>80% w./v.
pH of solution—a 40% w./v. solution has a pH of 10.6

Example 2

A preparation of 4:1 aspirin to gluconic acid chelates hydroxoaluminate. This compound was prepared by a similar procedure to that given for Example 1, but employing the following quantities of raw materials:

|  | G. |
|---|---|
| Dry sodium aluminate 93.8% ($Na_2O:Al_2O_3$=1.24) | 125 |
| Aspirin | 205 |
| Glucono-delta-lactone | 50 |

AVERAGE FORMULA IN MONOMERIC FORM $$Na_{1.24}[Al^{III}(C_6H_{10}O_7)_{0.2}(C_7H_4O_3)_{0.8}$$
$$(CH_3COO)_{0.8}(OH)_{1.44}(H_2O)_{1.76}]$$
$$306.67$$

The average ionic weight $=\frac{306.67}{2.24}=136.9$ $$=134.1$$

STRUCTURE

As monomers the species present will be—

$$6Na^+ + 4[Al^{III}(C_7H_4O_3)(CH_3COO)(OH)(H_2O)_2]$$
$$+[Al^{III}(C_6H_{10}O_7)(OH)_3(H_2O)]^{2-}$$

PROPERTIES

Appearance—a pinkish-white granular solid.
Solubility at 23° C.—approximately 65% w./v.
pH of solution—a 40% w./v. solution has a pH of 6.6

Example 3

A preparation of a mixed salicylato gluconato aluminate of similar aluminium to acids ratio as in Example 1, but of lower sodium content.

MATERIALS USED

|  | G. |
|---|---|
| Dry sodium aluminate 93.8% ($Na_2O:Al_2O_3$=1.24) | 125 |
| Aspirin | 118 |
| Glucono-delta-lactone | 117 |

The method of preparation was similar to that given for Example 1.

AVERAGE FORMULA IN MONOMERIC FORM $$Na_{1.24}[Al^{III}(C_6H_{10}O_7)_{0.5}(C_7H_4O_3)_{0.5}(CH_2COO)_{0.5}]$$
$$(OH)_{1.74}(H_2O)_{1.76}$$

STRUCTURE.—APPROXIMATE ESTIMATE OF DEGREE OF POLYMERISATION

The cryoscopic estimate of average ionic weight=181.8. If $x$=the number of aluminium ions in the complex anion $$\frac{311x}{1.24x+1}=182$$

$$x=2.13$$

This result indicates a mixed dimer of average formula $$Na_{2.48}[Al_2^{III}(C_6H_{10}O_7)(C_7H_4O_3)(CH_3COO)(OH)_{3.48}$$
$$(H_2O)_{1.52}]2H_2O$$
$$622.88$$

Average ionic weight $=\frac{622.88}{3.48}=179.0$

Observed=181.8

If the $2H_2O$ are lost on heat at 60° C. in vacuo the loss in weight will be $$\frac{36.032}{622.88}=5.78\%$$

Observed loss at 60° C. in vacuo =6.14%

In view of the Na:Al ratio* the components will be $$13Na_2[Al_2^{III}(C_6H_{10}O_7)(C_7H_4O_3)(CH_3COO)(OH)_3$$
$$(H_2O)_2]2H_2O$$
$$+$$
$$12Na_3[Al_2^{III}(C_6H_{10}O_7)(C_7H_4O_3)(CH_3COO)(OH)_4$$
$$(H_2O)]2H_2O$$
$$634.32$$

PROPERTIES

Appearance—light biscuit coloured granular solid
Solubility at 23° C.—>80% w./v.
pH of solution—a 40% w./v. solution has a pH of 6.7

Example 4

The preparation of a mixed salicylato/gluconatoaluminate in which the molar ratio of salicyclic acid to gluconic acid:: 95:5.

MATERIALS USED

|  | G. |
|---|---|
| Dry sodium aluminate 93.8% ($Na_2O:Al_2O_3$=1.24) | 19.07 |
| Glucono-delta-lactone | 1.78 |
| Salicyclic acid | 26.242 |
| Sodium hydroxide | 2.08 |

*The Na₃ dimer may be prepared by substituting aluminium isopropoxide (or active aluminium hydroxide) for part of the sodium aluminate.

PROCEDURE (1) The sodium aluminate was dissolved in 50 ml. of water with stirring which was continued for 30 minutes.

(2) The glucono-delta-lactone was dissolved in minimal water.

(3) Half the salicylic acid was dissolved in 1 litre of boiling water.

(4) Filtered sodium aluminate solution was poured into a mixture of 100 ml. of the salicylic acid solution and all of the gluconic acid solution.

(5) The solution from stage 4 was added to the rest of the salicylic acid solution gradually, until signs of precipitation of aluminium hydroxide were noted and at this stage the remaining half of the salicylic acid was added in solid form. When a clear solution resulted the remainder of the solution from point 4 was added.

(6) The sodium hydroxide was dissolved in minimal water and then added to the bulk of solution. After stirring an almost clear (very slightly translucent) solution resulted. Part of the solution was dried in vacuo at 60° C., and another portion was air dried.

AVERAGE FORMULA IN MONOMERIC FORM $$Na_{1.5}[Al^{III}(C_7H_4O_3)_{0.95}(C_6H_{10}O_7)_{0.05}(OH)_{2.5}(H_2O)_{1.5}]$$
$$270.00$$

STRUCTURE.—APPROXIMATE DEGREE OF POLYMERISATION

The cryoscopic estimate of average ionic weight=104.8. If $x$ represents the number of aluminium ions in the complex anion $$\frac{270x}{1.5x+1}=104.8$$

$$x=0.929$$

This indicates a monomer.

The compounds present may be represented as $$Na_2[Al^{III}(AO)(OH)_3(H_2O)]$$
$$281.00$$
$$+$$
$$Na[Al^{III}(AO)(OH)_2(H_2O)_2]$$
$$259.02$$

where AO=95% salicylato ion and 5% gluconato ion of average weight 139.0. (It is, of course, understood that the salicylato aluminates and gluconato aluminates, form separate anions.)

Average ionic weight=$\frac{540.02}{5}$

=108.0

Observed av. ionic weight=104.8

PROPERTIES

Appearance—a buff to pinkish granular solid
Solubility at 23° C., oven dried material c. 2.5% w./v.; air dried material c. 7.8% w./v.
pH of solution—the pH of a 2½% w./v. solution=10.2.

Example 5(a)

The preparation of a mixed acetatosalicylato gluconato magnesate.

MATERIALS USED

| | G. |
|---|---|
| Magnesium oxide | 10.08 |
| Sodium hydroxide | 30.00 |
| Glucono-delta-lactone | 44.5 |
| Aspirin | 22.52 |

PROCEDURE

The glucono-delta-lactone was dissolved in 200 ml. distilled water and heated to 80° C. Portions of magnesium oxide and aspirin were added alternately to keep as clear a solution as possible. Sodium hydroxide was dissolved in about 100 ml. distilled water and added to the bulk solution. The solution was then evaporated to dryness at 60° C. in vacuo.

AVERAGE FORMULA IN DIMERIC FORM $$Na_6[Mg_2^{II}(C_6H_{10}O_7)_2(C_7H_4O_3)(CH_3COO)(OH)_3]$$
$$821.07$$

The cryoscopic estimate of average ionic weight is 78.6 which is clearly less than a monomer, indicating a mixture of ions. Having regard to the common coordination number of magnesium of 4, the compounds are likely to be $$Na_2[Mg^{II}(C_7H_4O_3)(CH_3COO)(OH)]$$
$$+Na_2[Mg^{II}(C_6H_{10}O_7)_2]+2NaOH$$

Such a mixture would have 10 ions and the average ionic weight would be 82.1. Observed ionic weight =78.6.

Example 5(b)

The preparation described in Example 5a above was repeated save that the sodium hydroxide was reduced in amount to 20.00 g. This corresponds to a reduction of 2NaOH and the preparation would be expected to give a mixture of the two complex compounds with the omission of the surplus sodium hydroxide.

The components, therefore, are expected to be $$Na_2[Mg^{II}(C_7H_4O_3)(CH_3COO)(OH)]$$
$$282.50$$

$$+Na_2[Mg^{II}(C_6H_{10}O_7)_2]$$
$$458.58$$

Expected average ionic weight=$\frac{741.08}{6}$=123.51

It will be seen that the cryoscopic estimate of ionic weight is little more than that obtained in Example 5a, although the 4 simple ions arising from two molecules of sodium hydroxide were supposedly eliminated.

Furthermore, the pH of a 60% solution was found to be 11.3 which is higher than that of a 60% solution of the material from Example 5a, which was 11.0. These facts suggest a lower level of complex formation giving rise to a mixture of inner complexes and simple ions, including free sodium hydroxide, e.g.

$$[Mg^{II}(C_7H_4O_3)(H_2O)_2]^0$$
$$+[Mg^{II}(C_6H_{10}O_7)(H_2O)_2]^0+CH_3COO.Na$$
$$+CH_2OH(CHOH)_4COO.Na+2NaOH$$

The solution of this mixture would contain 10 ions or molecules of average weight=84.7. Observed cryoscopic weight=82.7.

PROPERTIES

Appearance—a white granular solid
Solubility at 23° C.—<60% w./v.
pH of solution—the pH of the 60% w./v. solution is 11.3.

When a quantity of the mixture containing the equivalent of 10 grains of aspirin was added to 100 ml. N/10 HCl no precipitate was formed, while a similar experiment—using an equivalent amount of sodium salicylate—gave a copious precipitate of salicylic acid. No precipitate occurred with the complex mixture until the strength of the 100 ml. pool of acid was increased to 0.4 N HCl.

Example 6

The preparation of a mixed salicylato gluconato calcate.

MATERIALS USED

| | G. |
|---|---|
| Calcium hydroxide | 14.8 |
| Sodium hydroxide | 16.0 |
| Glucono-delta-lactone | 53.4 |
| Salicylic acid | 13.8 |

PROCEDURE

The glucono-delta-lactone was dissolved in 200 ml. of distilled water and heated to 80° C. Portions of calcium hydroxide and salicylic acid were added alternately to keep as clear a solution as possible. Sodium hydroxide was dissolved in about 100 ml. of distilled water and added to the bulk solution. The solution was then evaporated to dryness at 60° C. in vacuo. The materials taken correspond to a composition:

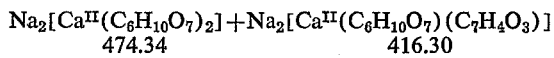
$Na_2[Ca^{II}(C_6H_{10}O_7)_2]+Na_2[Ca^{II}(C_6H_{10}O_7)(C_7H_4O_3)]$
474.34          416.30

Expected average ionic weight=148.44
Observed=91.3

Again, this result suggests a lower level of complex formation to leave free sodium hydroxide present, e.g.

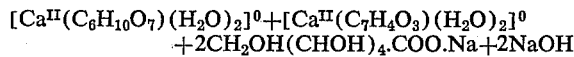
$[Ca^{II}(C_6H_{10}O_7)(H_2O)_2]^0+[Ca^{II}(C_7H_4O_3)(H_2O)_2]^0$
$+2CH_2OH(CHOH)_4.COO.Na+2NaOH$ Again, there are 10 ions or molecules present of average weight=99.3
Observed cryoscopic result=91.3.

PROPERTIES

Appearance—may be concentrated to a clear, almost dry, jelly. The material is insoluble after evaporation to dryness.
Solubility at 23° C.—≮75% w./v.
pH of solution—a 12% w./v. solution has a pH of 11.3.

Example 7

The preparation of a salicylato gluconato magnesate.

MATERIALS USED

| | G. |
|---|---|
| Magnesium oxide | 10.8 |
| Sodium hydroxide | 20.01 |
| Glucono-delta-lactone | 44.54 |
| Salicylic acid | 34.53 |

PROCEDURE

The procedure adopted for this preparation was identical with that used for Examples 5a and 5b save that the aspirin employed in those examples was substituted by salicylic acid.

The materials taken correspond to a formula

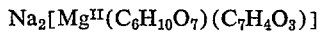
$Na_2[Mg^{II}(C_6H_{10}O_7)(C_7H_4O_3)]$

Molecular weight=400.54
Average ionic weight=133.51
Observed ionic weight=95.2

Once again, a mixture of less complex species is indicated, e.g.

$[Mg^{II}(C_6H_{10}O_7)(H_2O)_2]^0$
$+[C_6H_4(OH)COO.Na]+NaOH$

The presence of 5 ions or molecules in the solution is indicated of average weight=c. 91. Observed cryoscopic weight=95.2.

It is indicated in these preparations that the magnesium and calcium salicylato chelates with, or without, gluconic acid are stable only under alkaline conditions, i.e. the presence of excess hydroxyl ion leads to a higher level of complex formation. As further evidence of this, additional sodium hydroxide was added to a solution of the material of Example 7 at the rate of 1 mole NaOH to 1 mole of the compound of molecular weight 454.6. The following reaction might be expected to occur:

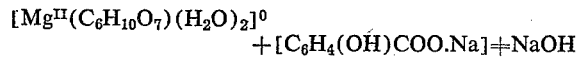
$C_6H_4(OH)COO.Na + NaOH + [Mg^{II}(C_6H_{10}O_7)(H_2O)_2]^0 + NaOH$ (extra mole) $\longrightarrow Na_2[Mg^{II}(C_6H_{10}O_7)(C_7H_4O_3)]\cdot 3H_2O+NaOH$
504.25

Expected average ionic weight=$\frac{494.6}{5}$=98.92

Observed cryoscopic ionic weight=98.45

PROPERTIES

Appearance—white granular solid
Solubility at 23° C.—≮80% w./v.
pH of solution—the pH of a 53% w./v. solution is 11.35

Example 8

The preparation of a wholly salicylato aluminate.

MATERIALS USED

| | G. |
|---|---|
| Dry sodium aluminate 93.8% ($Na_2O:Al_2O_3$=1.24) | 19.07 |
| Salicylic acid | 82.87 |
| Sodium hydroxide | 14.08 |

PROCEDURE (1) The sodium aluminate was dissolved in 100 ml. of water and filtered to remove iron.

(2) The sodium hydroxide was dissolved in 100 ml. of water and 48.6 g. of the salicylic acid was added and dissolved. The solution of sodium aluminate was then added to this mixture.

(3) The remaining salicylic acid was then added with stirring until dissolved.

(4) The solution was evaporated to dryness in vacuo at 60° C. The materials taken correspond to a compound of formula:

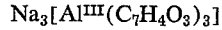
$Na_3[Al^{III}(C_7H_4O_3)_3]$

Molecular weight=504.25
Average ionic weight=126.06
Observed average ionic weight=107.8

Once again, the experimental results are in agreement with a lower degree of complex formation, viz.

$Na_2[Al^{III}(C_7H_4O_3)_2(OH)(H_2O)]+C_6H_4(OH)COO.Na$

Or the empirically equivalent:

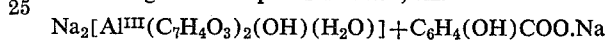
$Na_2[Al^{III}(AO)_2(AOH)].H_2O+NaOH$

These formulations correspond to 5 ions in solution of average weight=107.9. Observed ionic weight=107.8.

From these results it appears that the wholly aluminium salicylato chelates are only formed in the presence of free hydroxyl ion or at a low level of complex formation where part of the salicylate does not form the bidentate (AO) ion.

As with Example 7, additional sodium hydroxide was added to a solution of the material of Example 8 at the rate of 1 mole NaOH to 1 mole of the compound of molecular weight 504.25. The following reaction might be expected to occur:

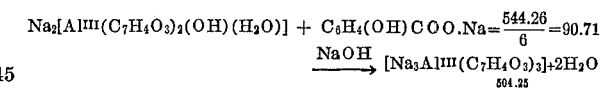
$Na_2[Al^{III}(C_7H_4O_3)_2(OH)(H_2O)] + C_6H_4(OH)COO.Na=\frac{544.26}{6}=90.71$
$\xrightarrow{NaOH} [Na_3Al^{III}(C_7H_4O_3)_3]+2H_2O$
504.25

Average ionic weight (trisodium trisgluconatoaluminate III+NaOH)
Observed cryoscopic estimate=88.6

PROPERTIES

Appearance—an off-white granular solid
Solubility at 23° C.=c. 12%
pH of solution—the pH of a 12% solution is 9.7

Example 9

The preparation of an acetatosalicylatoaluminate.

MATERIALS USED

| | G. |
|---|---|
| Dry sodium aluminate 93.8% ($Na_2O:Al_2O_3$=1.24) | 19.07 |
| Aspirin | 36.03 |
| Sodium hydroxide | 14.08 |

PROCEDURE (1) The dry sodium aluminate was dissolved in 100 ml. of water and filtered to remove iron.

(2) The sodium hydroxide was dissolved in 100 ml. of water and the whole of the aspirin was then dissolved in the solution of sodium hydroxide.

(3) The sodium aluminate solution was then added to the solution prepared in Stage 2.

(4) The solution was evaporated to dryness in vacuo at 60° C.

The materials taken correspond to a compound of the formula:

$$Na_3[Al^{III}(CH_3COO)(C_7H_4O_3)(OH)_3]$$

Molecular weight=342.16
Average ionic weight=85.54
Observed average ionic weight=54.9

The experimental result may be explained on the basis of a lower degree of complex formation in the presence of free sodium hydroxide, viz.

$$[Al^{III}(C_7H_4O_3)(CH_3COO)(H_2O_3)]^0 + 3NaOH$$

This corresponds to 7 ions or molecules in solution of average weight=56.2. Cryoscopic weight=54.9.

PROPERTIES

Appearance—an off-white granular solid with slightly pink tinge.
Solubility at 23° C.—approximately 4%
pH of solution—the pH of a c. 4% solution is 11.3.

Example 10

The preparation of a hydroxylaluminate chelate composition of tartaric and salicylic acids.

MATERIALS USED

|  | G. |
|---|---|
| Dry sodium aluminate 93.8% ($Na_2O:Al_2O_3=1.24$) | 19.07 |
| Tartaric acid | 15.01 |
| Salicylic acid | 13.81 |

PROCEDURE (1) The dry sodium aluminate was dissolved in water and filtered to remove iron. The solution was then diluted to 600 ml.
(2) The tartaric acid was dissolved in 500 ml. of hot water.
(3) The salicyclic acid was dissolved in 800 ml. of boiling water.
(4) The tartaric acid solution was added slowly to the sodium aluminate solution and was followed by the addition of the salicyclic acid solution. Stirring was maintained throughout this addition.
(5) The bulk of the water was distilled off under vacuum and drying was completed in vacuo at 60° C.

AVERAGE FORMULA IN MONOMERIC FORM $$Na_{1.24}[Al^{III}(C_4H_2O_6)_{0.5}(C_7H_4O_3)_{0.5}(OH)_{1.24}(H_2O)_{1.76}]$$
$$249.37$$

STRUCTURE.—APPROXIMATE ESTIMATE OF DEGREE OF POLYMERISATION

The cryoscopic estimate of average ionic weight=123.
If $x$=the number of aluminium ions in the complex anion $$\frac{249x}{1.24x+1}=123$$

$$x=1.27$$

As the tartrato ligand forms a double ring the expectation is at least a dimer. The above result, therefore, suggests a tartrato dimer and a salicylato monomer. The average formula is closely equivalent to:

$$Na_5[Al_4^{III}(C_4H_2O_6)_2(C_7H_4O_3)_2].7H_2O$$
$$249.59 \times 4$$

The expected dimer and monomer would be respectively—

$$Na_3[Al_2^{III}(C_4H_2O_6)_2(OH)(H_2O)_3]$$
and
$$2 Na[Al^{III}(C_7H_4O_3)(OH)_2(H_2O)_2]$$

$$\text{Average ionic weight}=\frac{4 \times 249.59}{8}$$
$$=124.8$$

Observed cyroscopic weight=122.8

PROPERTIES

Appearance—an off-white glassy solid
Solubility at 23° C.—<75% w./v.
pH of solution—a 50% w./v. solution has a pH of 9.4

Example 11

The preparation of an ammonium hydroxoaluminate chelate composition of citric and salicylic acids.

|  | G. |
|---|---|
| Aluminium chloride hexahydrate (98%) | 15.4 |
| Citric acid monohydrate | 6.566 |
| Salicylic acid | 4.33 |
| Ammonium hydroxide (SG 0.88) | 4.579 |

PROCEDURE (1) The aluminium chloride was dissolved in 200 ml. of water and ammonium hydroxide (additional to the amount shown above) was added to pH 7.
(2) The aluminium hydroxide was filtered off and washed until free of chloride iron.
(3) The citric acid was dissolved in 300 ml. of water and the fresh aluminium hydroxide stirred in. This was dissolved with the aid of gentle heat.
(4) The ammonium hydroxide was diluted to 50 ml. and added to the solution of aluminium hydroxide in citric acid.
(5) The solid salicylic acid was added and dissolved with the aid of heat.
(6) Finally, the solution was evaporated to dryness in vacuo at 60° C.

AVERAGE FORMULA IN MONOMERIC FORM $$(NH_4)_{1.5}[Al^{III}(C_6H_4O_7)_{0.5}(C_7H_4O_3)_{0.5}(OH)_{1.5}(H_2O)_{1.5}]$$
$$268.67$$

STRUCTURE.—APPROXIMATE ESTIMATE OF DEGREE OF POLYMERISATION

The cryoscopic estimate of average ionic weight=126.35

If $x$=the number of aluminium ions in the compleg anion $$\frac{269x}{1.5x+1}=126$$

$$x=1.58$$

As the citrato ligand forms a double ring and a dimer is the lowest expectation, the above result suggests a citrato dimer and a salicylato monomer, as follows:

$$(NH_4)_4[Al_2^{III}(C_6H_4O_7)_2(OH)_2(H_2O)_2]$$
and
$$2NH_4[Al^{III}(C_7H_4O_3)(OH)_2(H_2O)_2]$$

$$\text{The average ionic weight}=\frac{1074.68}{9}$$
$$=119.4$$

Observed cyroscopic weight=126.4

PROPERTIES

Appearance—a white granular solid
Solubility at 23° C.—c. 3% w./v.
pH of solution—the pH of a c. 3% solution is 6.0

REACTION WITH SODIUM HYDROXIDE

When treated in the cold with 3 N NaOH, ammonia is freely evolved.

Example 12

The preparation of a potassium hydroxoaluminate chelate composition of citric and salicylic acids.

MATERIALS USED

|  | G. |
|---|---|
| Aluminium chloride hexahydrate (98%) | 15.4 |
| Citric acid monohydrate | 6.566 |
| Salicylic acid | 4.33 |
| Potassium hydroxide | 5.26 |

17

The method of preparation was similar to that given for Example 11, substituting potassium hydroxide for ammonium hydroxide at Stage 4.

AVERAGE FORMULA IN MONOMERIC FORM $$K_{1.5}[Al^{III}(C_6H_4O_7)_{0.5}(C_7H_4O_3)_{0.5}(OH)_{1.5}(H_2O)_{1.5}]$$
300.26

STRUCTURE.—APPROXIMATE ESTIMATE OF DEGREE OF POLYMERISATION

The cryoscopic estimate of average ionic weight=182.4

If $x$=the number of aluminium ions in the complex anion $$\frac{300x}{1.5x+1}=182$$

$$x=6.7$$

This indicates an average degree of polymerization of 7. The compounds will comprise:

$$K_{12}[Al_8^{III}(C_6H_4O_7)_4(C_7H_4O_3)_4(OH)_{12}(H_2O)_6].6H_2O$$

and $$K_9[Al_6^{III}(C_6H_4O_7)_3(C_7H_4O_3)_3(OH)_9(H_2O)_5].4H_2O$$

The average ionic weight will be $\frac{14 \times 300.26}{23} = 182.7$

Observed cryoscopic estimate=182.4

PROPERTIES

Appearance—a white solid with slight pinkish tinge
Solubility at 23° C.—≮ 80% w./v.
pH of solution—the 80% w./v. solution has a pH of 7.6

Example 13

The preparation of an hydroxoaluminate chelate composition of lactic acid and salicylic acid.

MATERIALS USED

|  | G. |
|---|---|
| Dry sodium aluminate 93.8% ($Na_2O:Al_2O_3$=1.24) | 19.07 |
| Sodium hydroxide | 2.08 |
| Lactic acid (88% w./v.) | 20.48 |
| Salicylic acid | 27.62 |

PROCEDURE (1) A solution of the sodium aluminate was prepared and filtered and then made up to 250 ml.
(2) 50 ml. of the sodium aluminate solution was added to the lactic acid with stirring.
(3) Solid salicylic acid and sodium aluminate solution were added alternately until all had been incorporated.
(4) The sodium hydroxide was added in solution.
(5) The solution was evaporated to dryness in vacuo at 60° C.

AVERAGE FORMULA IN MONOMERIC FORM $$Na_{1.5}[Al^{III}(C_3H_4O_3)_{0.5}(C_7H_4O_3)_{0.5}(OH)_{2.5}(H_2O)_{1.5}]$$
243.10

STRUCTURE.—APPROXIMATE ESTIMATE OF DEGREE OF POLYMERISATION

The cryoscopic estimate of average ionic weight=137.18

If $x$=the number of aluminium ions in the complex anion $$\frac{243x}{1.5x+1}=137$$

$$x=3.65$$

This result indicates a 4$x$ polymer

18

FORMULA $$Na_6[Al_4^{III}(C_3H_4O_3)_2(C_7H_4O_3)_2(OH)_{10}]6H_2O$$
972.4

Average ionic weight=$\frac{972.4}{7}$

=138.9

Observed cryoscopic weight=137.18

PROPERTIES

Appearance—a dark cream coloured solid
Solubility at 23° C.—≮ 70% w./v.
pH of solution—a 40% solution has a pH of 7.7

Example 14

The preparation of an hydroxoaluminate chelate composition of gentisic acid and gluconic acid.

MATERIALS USED

|  | G. |
|---|---|
| Dry sodium aluminate 93.8% ($Na_2O:Al_2O_3$=1.24) | 19.07 |
| Sodium hydroxide | 2.08 |
| Gentisic acid trihydrate | 20.81 |
| Glucono-delta-lactone | 17.8 |

PROCEDURE (1) The procedure followed was identical with that shown in Example 1 substituting gentisic acid for aspirin.

AVERAGE FORMULA IN MONOMERIC FORM $$Na_{1.5}[Al^{III}(C_7H_4O_4)_{0.5}(C_6H_{10}O_7)_{0.5}(OH)_{2.5}(H_2O)_{1.5}]$$
305.14

STRUCTURE.—APPROXIMATE ESTIMATE OF DEGREE OF POLYMERISATION

The cryoscopic estimate of average ionic weight =170.01. If $x$= the number of aluminium ions in the complex anion $$\frac{305x}{1.5x+1}=170$$

$$x=3.4$$

The experimental data correspond to 3$x$ or 4$x$ polymers with approximately equally good agreement. In view of the finding of the 4$x$ polymer for the analogous compound in Example 13 this has been given preference.

FORMULA $$NA_6[Al_4^{III}(C_7H_4O_4)_2(C_6H_{10}O_7)_2(OH)_{10}]6H_2O$$
1220.56

Average ionic weight=$\frac{1220.56}{7}$=174.3

Observed cyroscopic weight=170.01

PROPERTIES

Appearance—light brown granular solid
Solubility at 23° C.—≮60% w./v.
pH of solution—the pH of a 40% solution is 10.15

Example 15

The preparation of a magnesium hydroxoaluminate composition of salicylic and gluconic acids.

MATERIALS USED

|  | G. |
|---|---|
| Aluminium isopropoxide | 25.53 |
| Glucono-delta-lactone (1) | 22.25 |
| Salicylic acid | 17.27 |
| Glucono-delta-lactone (2) | 11.13 |
| Magnesium oxide | 5.04 |

PROCEDURE (1) The aluminium isopropoxide (30 mesh) was added slowly to a solution of a glucono-delta-lactone (1) dissolved in 50 ml. of distilled water at 80° C. The mixture was maintained at 80° C. with stirring until dissolution was completed.

(2) The glucono-delta-lactone (2) and the salicylic acid were slurried together in c. 50 ml. of distilled water at 80° C. and the magnesium oxide was added. Mixing was continued at 80° C. for about 15 minutes.

(3) The mixture from stage 2 was added slowly to the solution from stage 1 and the temperature was maintained at 80° C. until a clear solution resulted.

(4) The solution from stage 3 was evaporated to dryness in vacuo at 60° C.

AVERAGE FORMULA IN MONOMERIC FORM $$Mg[Al^{III}(C_6H_{10}O_7)_{1.5}(C_7H_4O_3)(H_2O)]$$

PROPERTIES

Appearance—white translucent platelets
Solubility at 23° C.—<60% w./v.
pH of solution—40% solution has a pH of 5.22.

Example 16

The preparation of a calcium hydroxoaluminate composition of salicylic and gluconic acids.

MATERIALS USED

| | G. |
|---|---|
| Aluminium isopropoxide | 25.53 |
| Glucono-delta-lactone (1) | 22.25 |
| Salicylic acid | 17.27 |
| Glucono-delta-lactone (2) | 11.13 |
| Calcium oxide | 7.02 |

PROCEDURE (1) The aluminium isopropoxide (30 mesh) was added slowly to a solution of the glucono-delta-lactone (1) dissolved in 50 ml. of distilled water at 80° C. The mixture was maintained at 80° C. with stirring until dissolution was complete.

(2) The glucono-delta-lactone (2) and the salicylic acid were slurried together in c. 50 ml. of distilled water at 80° C. and the calcium oxide was added. Mixing was continued at 80° C. for about 15 minutes.

(3) The maximum from stage 2 was added slowly to the solution from stage 1 and the temperature was maintained at 80° C. until a clear solution resulted.

(4) The solution from stage 3 was evaporated to dryness in vacuo at 60° C.

AVERAGE FORMULA IN MONOMERIC FORM $$Ca[Al^{III}(C_6H_{10}O_7)_{1.5}(C_7H_4O_3)(H_2O)]$$

PROPERTIES

Appearance—a pinkish white solid
Solubility at 23° C.—7.8% w./v.
pH of a saturated solution—4.9.

Example 17

The preparation of an analgesic syrup containing 7.3 grains aspirin per teaspoonfull (4 ml.) dose.

MATERIALS USED PER LITRE OF PRODUCT

| | G. |
|---|---|
| Dry sodium aluminate 93.8% ($Na_2O:Al_2O_3=1.24$) | 125 |
| Aspirin | 118 |
| Glucono-delta-lactone | 117 |
| Sucrose | 415 |

PROCEDURE (1) The dry sodium aluminate was dissolved in 250 ml. of water with stirring.

(2) The glucono-delta-lactone was dissolved in 130 ml. of cold water.

(3) The sodium aluminate solution was poured into the gluconic acid solution and after a few minutes stirring 2.5 g. of a filter aid was added and the suspension was filtered to remove iron and any other insolubles. The filtration was carried out under vacuum using a grade 540 filter paper.

(4) The aspirin was now stirred into the clear solution and when dissolved the sugar was added with further stirring.

Finally, when dissolution was complete the syrup was suitably coloured and flavoured and the volume was made up to 1 litre with water. The resulting syrup was quite palatable and contained 7.5 grains of aspirin to the teaspoonful (4 ml.) dose.

The ability of the syrup to buffer the acid gastric juice was estimated by the antacid activity test of Gore, Martin and Taylor (J. Pharm. Pharmacol., 1953, 5, 686–691) modified to use a 4 ml. dose. It was found on this test that the highest pH reached was 4.9 and that 11 ml. of N HCl were neutralized to pH 3. This is an acid neutralizing capacity for a one teaspoonful dose superior to that of many liquid antacids currently marketed.

Example 18

The preparation of an effervescent saline mixture containing 5 grains of aspirin to the unit dose.

MATERIALS USED 2 parts by weight of a compound prepared from:

| | G. |
|---|---|
| Dry sodium aluminate 93.8% ($Na_2O:Al_2O_3=1.24$) | 125 |
| Glucono-delta-lactone | 152 |
| Aspirin | 117 |

1.6 parts by weight of a granular grade of sodium bicarbonate, 1.4 parts by weight of a crystalline grade of tartaric acid. The dry components were thoroughly blended and packed into sachets each containing a quantity of 5 g. of the mixture. Each sachet therefore contained, on the average,

| | G. |
|---|---|
| Analgesic compound | 2 |
| Sodium bicarbonate | 1.6 |
| Tartaric acid | 1.4 |

When the contents of a sachet were added to a tumbler one third filled with water, a vigorous effervescence ensued, leaving a clear solution without scum. The flavour was considered to be very palatable and each dose contained the equivalent of 5 grains of aspirin.

Example 19

The preparation of a mixed acetatosalicylatogluconato ferrate.

MATERIALS USED

| | G. |
|---|---|
| Ferrous sulphate hepta hydrate | 69.51 |
| Sodium carbonate | 26.5 |
| Glucono-delta-lactone | 44.5 |
| Aspirin | 22.52 |
| Sodium hydroxide | 30.0 |

PROCEDURE

The ferrous sulphate was dissolved in about 300 ml. of water and the sodium carbonate dissolved in an equal amount of water was added to precipitate ferrous carbonate. The ferrous carbonate was washed by repeated decantation and then the glucono-delta-lactone, dissolved in 200 ml. of water, was added followed by the aspirin in several increments. Finally, at the completion of dissolution the sodium hydroxide, dissolved in about 100 ml. of water, was added. The solution was evaporated to dryness at 60° C. in vacuo.

PROPERTIES

Appearance—olive-green, non-crystalline solid.
Solubility at 23° C.: about 3%

N.B. The solution, as first prepared, was about 10% and this was concentrated to a clear syrup before the solid substance separated out. This solid substance proved to be less soluble, although the solution may again be concentrated.

pH of a 10% solution: 12.25

Example 20

The preparation of sodium gluconatosalicylatodiaquo-aluminate III.

MATERIALS USED

|  | G. |
|---|---|
| Aluminium isopropoxide | 20.42 |
| Glucono-delta-lactone (99%) | 18.00 |
| Salicylic acid | 13.81 |
| Sodium hydroxide | 4.00 |

PROCEDURE (1) The aluminium isopropoxide (30 mesh) was added slowly to a solution prepared by dissolving the glucono-delta-lactone in 50 ml. of distilled water at 80° C. The mixture was maintained at 80° C. with stirring until dissolution was complete.

(2) The sodium hydroxide was dissolved in 30 ml. of water at about 30° C. and the salicylic acid was dissolved in this solution.

(3) The solution prepared in stage 2 was added to the solution prepared in stage 1.

The solution of the compound sodium gluconato-salicylatodiaquoaluminate III, prepared as described, was found to have only a limited stability, but a further addition of 1.4% of sodium hydroxide (calculated on the dry compound weight) stabilized the solution and enabled it to be prepared in dry form by evaporating in vacuo at 60° C.

FORMULA $$Na[Al^{III}C_6H_{10}O_7 \cdot C_7H_4O_3 \cdot (H_2O)_2]$$

molecular weight 416.23

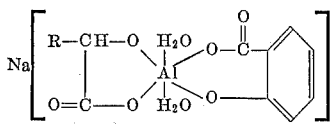

As a result of the addition of the extra sodium hydroxide the composition comprised a mixture of predominantly the monosodium compound and a small amount of the next higher hydroxo analogue—the disodium compound. A second preparation carried out in more dilute solution (total water 120 ml.) was successful without the additional sodium hydroxide.

PROPERTIES

Appearance: white granular solid
Solubility at 23° C.: > 50% w./v.
pH of 10% solution: (a) with additional sodium hydroxide 5.5; (b) without additional sodium hydroxide 4.65

Example 21

The preparation of disodium acetatogluconatosalicylato-aquoaluminate III.

MATERIALS USED

|  | G. |
|---|---|
| Aluminium isopropoxide | 20.42 |
| Glucono-delta-lactone (99%) | 18.00 |
| Aspirin | 18.02 |
| Sodium hydroxide | 8.00 |

PROCEDURE (1) The aluminium isopropoxide (30 mesh) was added slowly to a solution prepared by dissolving the glucono-delta-lactone in 50 ml. of distilled water at 80° C. The mixture was maintained at 80° C. with stirring until dissolution was complete.

(2) The sodium hydroxide was dissolved in 50 ml. of water at 30° C. The aspirin was dissolved in this solution.

(3) The solution prepared in stage 2 was added to the solution prepared in stage 1.

(4) The solution was evaporated in vacuo at about 60° C. to produce the solid compound.

FORMULA $$Na_2[Al^{III}(C_6H_{10}O_7 \cdot C_7H_4O_3 \cdot CH_3COO \cdot H_2O]$$

molecular weight 480.29

PROPERTIES

Appearance: white granular solid
Solubility at 23° C.: >60% w./v.
pH of 10% solution: 5.15

Example 22

Materials required for 1 g./mol. of Compound I:

95.29 g. of sodium aluminate having a 93.80% content of material of molecular ratio $Na_2O/Al_2O_3 = 1:1.24$
180.16 g. of acetylsalicylic acid
359.90 g. of glucono-delta-lactone (99%)
109.41 g. of sodium hydroxide.

The sodium aluminate was stirred in 150 ml. of water for thirty minutes. Meanwhile, 20% of the glucono-delta-lactone (71.98 g.) was agitated in 100 ml. of water until dissolved. Then the gluconic acid solution was added to the sodium aluminate solution.

Then 30% of the solid acetylsalicylic acid (54.05 g.) was dissolved in the solution, care being taken to stir vigorously and the acetylsalicylic acid not being added too rapidly. When dissolved, about 15 g. of Hyflo Supercel filter-aid was added, and filtered while still warm. The rest of the glucono-delta-lactone (287.92 g.) dissolved in 130 ml. of water was added.

With constant stirring the remainder of the acetylsalicylic acid (126.11 g.) was added gradually to the sodium hydroxide in 180 ml. water. The second solution was added to the first solution with constant stirring, and the mixture was evaporated to dryness (constant weight) in vacuo at 70° C.

This gave an odourless, off-white, non-crystalline solid with a sharp flavour, having the properties:

Solubility in water at 25°: C. >80% w./v.
Insoluble in either, chloroform, benzene, alcohol and carbon tetrachloride
pH of 40% solution=7.10

The 40% solution is clear, straw coloured, and has a slightly sour odour.

Acid neutralizing capacity:

1 gramme (dry basis) in 200 ml. of water required 5.4 ml. N.hydrochloric acid to reduce to pH 3.
Specific rotation=+30.5°
Ultra-violet absorption

| Wavelength | Max. or Min. | E 1% 1 cm. |
|---|---|---|
| 230 mμ | Maximum | 98.09 |
| 259 mμ | Minimum | 3.45 |
| 297 mμ | Maximum | 49.50 |

Refractive index, 10% solution w./v. in $H_2O = 1.349$
Sulphated ash, $Na_2SO_4 + Al_2(SO_4)_3$ determined by weighing immediately after the evolution of white fumes of $H_2SO_4$ ceases.
Calculated=63.75% w./w. (on dry basis)
Observed=64.50%

Example 23

The preparation of a flavoured analgesic syrup.
The following materials were taken:

|  | Percent w./v. |
|---|---|
| Dry sodium aluminate 93.8% ($Na_2O:Al_2O_3 = 1.24$) | 6.347 |
| Glucono-delta-lactone | 22.241 |
| Acetylsalicylic acid | 12.000 |
| Sodium hydroxide | 6.807 |
| Sucrose | 40.000 |
| Colour and flavour q.s. | |

The dry sodium aluminate was suspended in about 20% of the available water and stirred for 30 minutes. To this suspension was added 20% of the glucono-delta-lactone dissolved in a further 20% of the water. About 30% of the solid acetylsalicylic acid was then dissolved in the solution. The remaining glucono-delta-lactone was dissolved in 40% of the water (warm) and the solution was added to the one already prepared. The remainder of the acetylsalicylic acid was dissolved in a solution of the sodium hydroxide in the rest of the water and this was added to the main bulk. The temperature was maintained at about 80° C. for 30 minutes. After filtration through a prepared bed, the sugar was dissolved in the solution and any colours and flavours were added. The resulting product contained the equivalent of 10 gr. of acetylsalicylic acid in 5 ml. of syrup.

Compound I is a buffer antacid as well as being an analgesic compound. It was found that 5 ml. of product when examined by the test of Gore, Martin & Taylor (Ref.: J. Pharm. Pharmacol. 5, 686–691, 1953) neutralised 12.0 ml. N.hydrochloric acid to pH 3, the peak pH being 5.2.

Example 24

The preparation of an effervescent granular product.

The following materials were taken to prepare 100 g. of effervescent granules:

|  | G. |
|---|---|
| "Alfloc" Dry sodium aluminate | 6.342 |
| Acetylsalicylic acid B.P. | 11.990 |
| Glucono-delta-lactone | 23.952 |
| Sodium hydroxide B.P. | 7.282 |
| Citric acid monohydrate B.P. | 5.926 |
| Tartaric acid B.P. | 20.828 |
| Sodium sesquicarbonate dihydrate | 28.162 |
| Sweetener and flavour q.s. | |

A solution of Compound I was prepared as described in Example 2 (i.e. up to the stage before the addition of the sucrose). The syrupy solution was then evaporated to dryness in a vacuum evaporator, a light, flaky solid being obtained.

The citric and tartaric acids and half the sesquicarbonate were blended and allowed to stand without mixing for a few minutes; this resulted in a slightly doughy mass. Compound I and the remaining sodium sesquicarbonate (with which were incorporated any sweetener and flavour) were added in alternate increments to the mass and mixing was then resumed to the stage of a well formed granule. The granules were dried at 50° C.

A product was obtained in which the available carbon dioxide was of the order of 10%, 5 g. dissolving in a draught of water to give a clear solution containing the equivalent of 10 gr. of acetylsalicylic acid. The employment of sodium sesquicarbonate both facilitated the granulation process and gave a product having exceptionally good solubility characteristics.

Example 25

The preparation of an effervescent analgesic tablet.

|  | G. |
|---|---|
| Compound I | 350.00 |
| Citric acid monohydrate | 96.43 |
| Tartaric acid | 304.11 |
| Sodium sesquicarbonatedihydrate | 411.14 |
| Sweetener and flavour q.s. | |

Granulation was effected by the method described in Example 3. The dried granules were passed through a 30 mesh sieve and blended with 2% of polyethylene glycol 4000 lubricant. The mixture was compressed to give 4 g. tablets containing the equivalent of 5 gr. of acetylsalicylic acid.

Example 26

The preparation of a soluble, flavoured, analgesic powder.

|  | G. |
|---|---|
| Compound I | 70.000 |
| Sodium sesquicarbonate dihydrate | 3.948 |
| Tartaric acid | 3.835 |
| Sucrose | 5.525 |
| Sodium cyclamate | 4.144 |
| Flavour q.s. | |

Compound I was prepared as described in previous Examples. This compound was then blended with the remaining ingredients, these having been sifted (preceded by milling where necessary) through an 80 mesh sieve.

3 g. of product, when stirred into a draught of water gave a clear solution containing the equivalent of 10 gr. of acetylsalicylic acid.

What I claim is:

1. Compounds having analgesic and antipyretic properties of the general formula:

$$M_x[M'_y(AO)_z(CH_3CO.O)_w(OH)_{1x-w+y(m-2z)}(H_2O)_v]_n$$

and dimers thereof wherein M is magnesium, calcium, sodium, potassium or the ammonium radical, M' is aluminium, magnesium, iron or calcium, and AO is the salicylato bidentate ion:

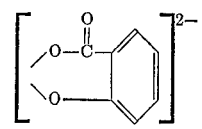

or the 5-hydroxysalicylato ion, together with at least 5% of an ion or ions selected from the group consisting of the bidentate ions formed from the monocarboxylic alpha-hydroxy acids of the formula:

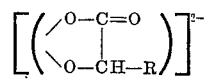

in which R is $CH_3$ or

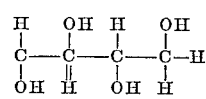

and the tetradentate ions formed from tartaric and citric acids of the respective formulae:

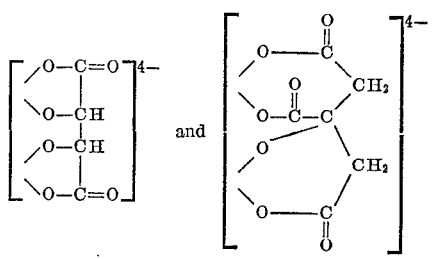

wherein $x$ is an integer from 1 to 5 inclusive, Y is 1 or 2, $w$ is an integer from 0 to 4 inclusive, $z$ is an integer from 1 to 4 inclusive, $n$ is 2 for bidentate ions when the valency of M is greater than 1 and is unity in all other cases, $l$ is the valency of M divided by $n$, $m$ is the valency of M' and $v$ is an integer from 0 to 6 inclusive.

2. The compound of the formula

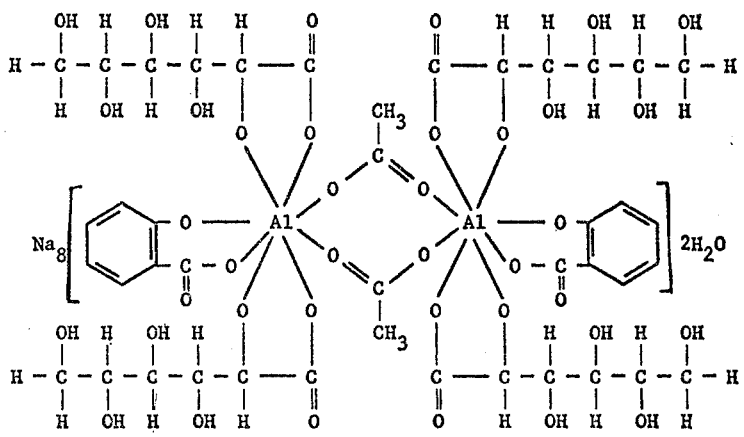

3. A process for preparing the compounds claimed in claim 1, which process comprises reacting in solution, acid, neutral or basic alpha-hydroxy acid salts of the metals M and M'.

4. A process as claimed in claim 3, wherein the acid, neutral or basic α-hydroxy acid salts are prepared in situ from the metals or their oxides, hydroxides, alkoxides or carbonates and the appropriate hydroxy acids.

5. A process as claimed in claim 1 for preparing compounds in which M is an alkali metal and M' is aluminium, wherein there are brought together in solution an alkali metal aluminate and one or more of the acids acetylsalicylic acid, salicylic acid and 5-hydroxysalicylic acid, and one or more of the acids lactic, gluconic, citric and tartaric acids.

References Cited

UNITED STATES PATENTS

| | | | |
|---|---|---|---|
| 3,100,787 | 8/1963 | Staib | 260—448 |
| 3,200,136 | 7/1963 | Grassmith. | |
| 1,967,649 | 7/1934 | Wolf | 260—448 |
| 2,327,815 | 8/1943 | Niedercorn et al. | 260—448 |
| 2,874,177 | 2/1959 | Hayano | 260—448 |

OTHER REFERENCES

Burrows and Wark, "Chemical Society Journal," January-June 1928, pp. 226 and 227.
Chemical Abstracts, vol. 53, pp. 4757g, 1959.
Chemical Abstracts, vol. 8, pp. 61–62, 1914.
Chemical Abstracts, vol. 50, pp. 8362d, 1956.

TOBIAS E. LEVOW, *Primary Examiner.*
H. M. S. SNEED, *Assistant Examiner.*

UNITED STATES PATENT OFFICE
CERTIFICATE OF CORRECTION

Patent No. 3,391,176                      July 2, 1968

Frederick Grossmith

It is certified that error appears in the above identified patent and that said Letters Patent are hereby corrected as shown below:

In the heading to the printed specification, under line 12, insert -- Claims priority, application Great Britain, Apr. 24, 1962, 15,429/62; Aug. 10, 1959, 27,330/59 --. Column 5, line 32, "salicylatogluconatodihydroxodiaque" should read -- salicylatogluconatodihydroxodiaquo --.

Signed and sealed this 30th day of December 1969.

(SEAL)
Attest:

Edward M. Fletcher, Jr.                    WILLIAM E. SCHUYLER, JR.
Attesting Officer                          Commissioner of Patents